No. 850,761. PATENTED APR. 16, 1907.
E. KNEEZELL.
TOBACCO PIPE.
APPLICATION FILED JAN. 16, 1907.

2 SHEETS—SHEET 1.

Witnesses
W. May Durall
Myron F. Clear

Inventor
Edward Kneezell
by Wilkinson & Fisher
Attorneys.

No. 850,761. PATENTED APR. 16, 1907.
E. KNEEZELL.
TOBACCO PIPE.
APPLICATION FILED JAN. 16, 1907.

2 SHEETS—SHEET 2.

Witnesses
W. Map. Durall
Myron F. Clear

Inventor
Edward Kneezell,
by Williamson & Fine
his Attorneys

UNITED STATES PATENT OFFICE.

EDWARD KNEEZELL, OF EL PASO, TEXAS.

TOBACCO-PIPE.

No. 850,761.  Specification of Letters Patent.  Patented April 16, 1907.

Application filed January 16, 1907. Serial No. 352,609.

*To all whom it may concern:*

Be it known that I, EDWARD KNEEZELL, a citizen of the United States, residing at El Paso, in the county of El Paso and State of Texas, have invented certain new and useful Improvements in Tobacco-Pipes; and I do hereby declare the following to be a full, clear, and exact description of the invention, such as will enable others skilled in the art to which it appertains to make and use the same.

My invention relates to tobacco-pipes, and has in view the promotion of a cool, sweet, and sanitary smoke.

Broadly, my invention consists in inaugurating a series of supplemental ducts or conduits in the wall of the pipe-bowl at substantially right angles to the main duct, which runs from the bowl through the stem to the mouth. By this means the smoke is caused to travel a greater distance than usual, and in doing so it becomes cool and sweet and prevents saliva from entering the fire-bowl. I also provide means adjacent said supplemental ducts for receiving and holding a filter or nicotin-absorber and means whereby both the main and supplemental ducts or conduits may be easily and quickly drained and cleaned.

In further and specific explanation of the construction and operation of parts I make repeated reference to the accompanying drawings, in which—

Figure 1:
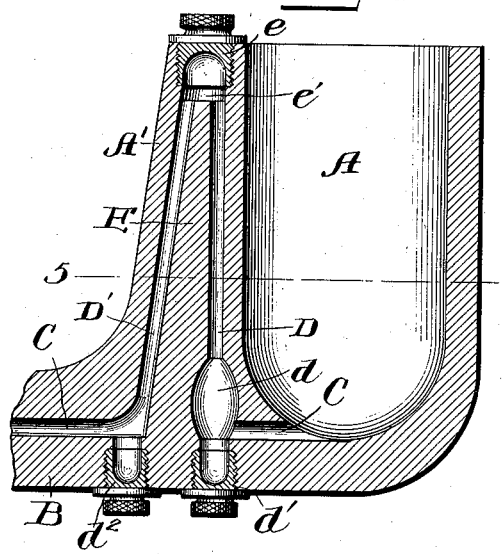
Figure 2:
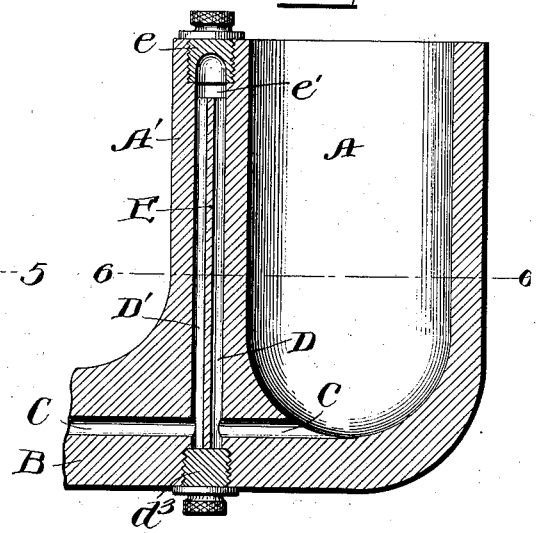
Figure 3:
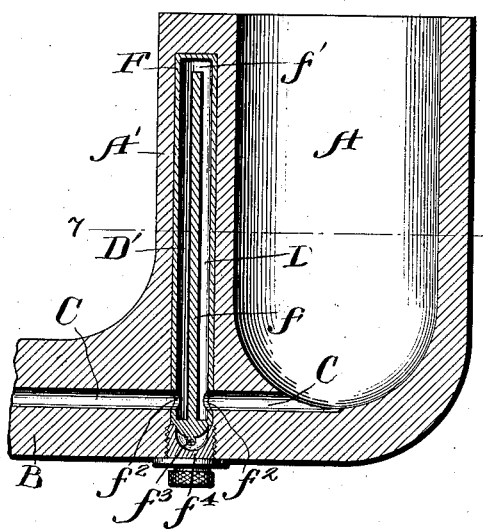
Figure 4:
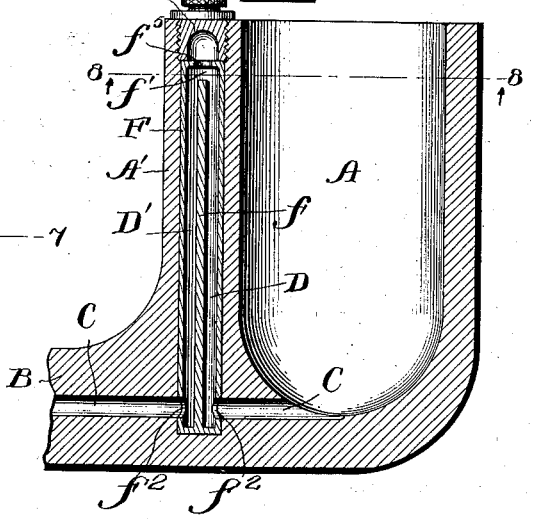
Figure 5:
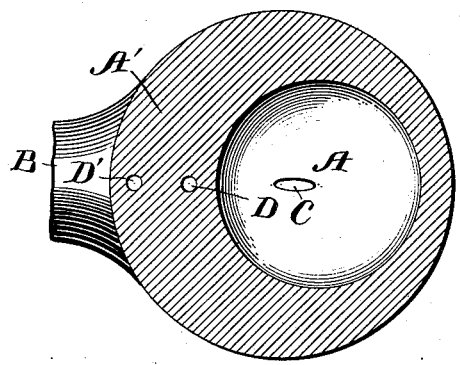
Figure 6:
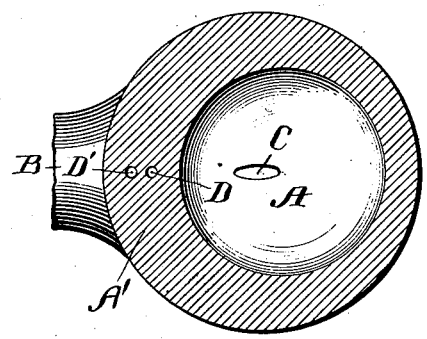
Figure 7:
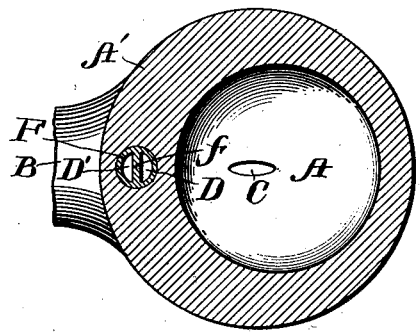
Figure 8:
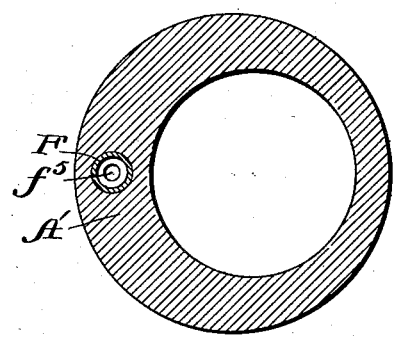
Figure 9:
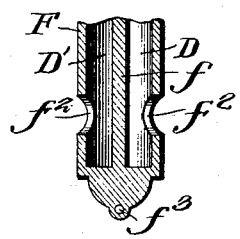

Figure 1 is a vertical section through the bowl with the stem broken away. Fig. 2 is a similar view of a slightly-modified form. Fig. 3 is a similar view of a second slight modification. Fig. 4 is a similar view of a third slight modification. Fig. 5 is a section on line 5 5 of Fig. 1. Fig. 6 is a section on line 6 6 of Fig. 2. Fig. 7 is a section on line 7 7 of Fig. 3. Fig. 8 is a section on line 8 8 of Fig. 4. Fig. 9 is a detail view, on an enlarged scale, of the lower portion of the tube shown in Fig. 3.

Referring to the several figures, A represents the bowl of the pipe, the wall of which is widened at A', and B represents the stem leading at right angles from the bowl A.

C is the main smoke-conduit, leading from bowl A through stem B.

D D' are the supplemental conduits arranged in the widened wall A' of the bowl A at substantially right angles to the main conduit C.

Referring specifically to Fig. 1, the main conduit C is shown leading into the supplemental conduit D, arranged at right angles thereto.

$d$ is an enlargement in conduit D adjacent conduit C and is designed to hold a filter or nicotin-absorber, which may be quickly inserted or withdrawn through the removable plug $d'$, screwed into the lower extension of conduit D.

E is a wall separating conduits D and D', which forces the smoke to ascend conduit D and pass over the top of wall E, which is cut off below the top of the bowl, leaving an opening $e'$ between the top of wall E and the removable plug $e$ for the smoke to pass into the supplemental conduit D'. Conduit D' is arranged diverging slightly from conduit D, as it continues downward to open into the main conduit C.

$d^2$ is a removable plug arranged in the lower extension of conduit D', similar in construction to plug $d'$, and is designed to allow the saliva or moisture which collects at the juncture of conduits C and D' to be withdrawn.

Referring to the slightly-modified form shown in Fig. 2, the supplemental conduits D D' are shown parallel with one another, and the separating-wall E is considerably narrower than in Fig. 1, necessitating only a single plug $d^3$ at the base of the supplemental conduits for cleaning and draining purposes instead of two. Removable plug $e$ is substantially the same as in Fig. 1, and the opening $e'$ is also used.

In the modified form shown in Fig. 3 a single opening is bored from the base of the pipe up through the widened portion A' of the wall of bowl A and extending to within a short space of the top thereof. Into this opening, which is at right angles to the main conduit C, is adapted to be inserted a hollow tube F, closed at both ends and having a central longitudinal partition $f$ extending nearly to the top thereof, an opening $f'$ being left. Tube F is also provided adjacent its lower ends with alined openings $f^2$ through its shell, adapted when the tube is inserted in the bore of the pipe to register with the main conduits C, as shown in Fig. 3. The lower portion of tube F is shown in detail in Fig. 9, illustrating clearly the small eye $f^3$ on the base of the tube to facilitate the removal thereof from the pipe after unscrewing the plug $f^4$.

Fig. 4 shows a very slight modification of the form shown in Fig. 3, the opening for the reception of tube F being bored from the top of the widened wall $A^7$ and extending just below the main conduit C. The registering-openings $f^2$ are as in Fig. 3; but instead of the small eye $f^3$ at the base of the tube in Fig. 3 I provide a small recess or opening $f^5$ in the top of the tube, in which any suitable instrument may be hooked to remove the tube for draining and cleaning. Plug $f^4$ is screwed in the top of the pipe in this form instead of at the base.

Having thus fully described my invention, what I claim is—

1. In a pipe, the combination of the bowl thereof, the wall of which is extended laterally terminating in a stem and provided with an upwardly-extending passage and a downwardly-extending passage, and passages in the stem and bowl portion connecting with said passages respectively, said first-named passages being enlarged at their upper and lower ends and communicating with holes bored into the top and bottom of said bowl respectively, and screw-threaded plugs having their interiors bored out screwed into said holes, substantially as described.

2. A pipe, comprising a bowl and a stem therefor, said stem having a passage therethrough and said bowl having one wall thereof extending rearwardly, a vertical passage in said rear wall, a passage connecting said vertical passage with the cavity in the pipe-bowl, an inclined passage connected to the passage in the pipe-stem and communicating with said first-named vertical passage, said pipe having holes bored thereinto at the ends of said upright passages, and screw-threaded plugs engaging said holes, said plugs being hollowed out to form cups, and said vertical passage being provided with an enlargement near its lower end, substantially as described.

In testimony whereof I affix my signature in presence of two witnesses.

EDWARD KNEEZELL.

Witnesses:
F. E. HUNTER,
SAMUEL H. LONDON.